(12) United States Patent
Chen et al.

(10) Patent No.: US 12,204,857 B2
(45) Date of Patent: Jan. 21, 2025

(54) SYSTEMS AND METHODS FOR TEXT CLASSIFICATION USING LABEL MODULAR PROMPTS

(71) Applicant: Salesforce, Inc., San Francisco, CA (US)

(72) Inventors: Hailin Chen, Singapore (SG); Amrita Saha, Singapore (SG); Shafiq Rayhan Joty, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 246 days.

(21) Appl. No.: 18/059,234

(22) Filed: Nov. 28, 2022

(65) Prior Publication Data
US 2023/0419049 A1 Dec. 28, 2023

Related U.S. Application Data

(60) Provisional application No. 63/355,476, filed on Jun. 24, 2022.

(51) Int. Cl.
| | | |
|---|---|---|
| G06F 40/284 | (2020.01) | |
| G06F 18/214 | (2023.01) | |
| G06F 18/2413 | (2023.01) | |
| G06F 40/295 | (2020.01) | |
| G06F 40/40 | (2020.01) | |

(52) U.S. Cl.
CPC ......... *G06F 40/284* (2020.01); *G06F 18/214* (2023.01); *G06F 18/2413* (2023.01); *G06F 40/295* (2020.01); *G06F 40/40* (2020.01)

(58) Field of Classification Search
USPC ..................................................... 704/1–504
See application file for complete search history.

(56) References Cited

U.S. PATENT DOCUMENTS

| | | | | |
|---|---|---|---|---|
| 12,019,994 B2* | 6/2024 | Xu | ..................... | G06N 3/006 |
| 2021/0319258 A1* | 10/2021 | Shen | ..................... | G16H 50/20 |
| 2022/0171947 A1* | 6/2022 | Xu | ..................... | G06N 20/00 |
| 2023/0342559 A1* | 10/2023 | Bhardwaj | ............ | G06N 20/00 |
| 2023/0419037 A1* | 12/2023 | Chen | ..................... | G06F 40/295 |
| 2023/0419049 A1* | 12/2023 | Chen | ..................... | G06F 40/40 |
| 2024/0161520 A1* | 5/2024 | Li | ..................... | G06N 3/08 |

* cited by examiner

*Primary Examiner* — Marcus T Riley
(74) *Attorney, Agent, or Firm* — Haynes and Boone, LLP

(57) ABSTRACT

Embodiments described herein provide training a prompt generator for text classification. A first training dataset associated with a first plurality of class labels is received for a first training process. For a first instance of the first training dataset, a set of labels of interest is generated by sampling from a set of possible class labels including the first plurality of class labels. The prompt generator generates a first prompt based on the set of labels of interest. A pretrained language model generates a task output in response to an input of the first instance prepended with the first prompt. A loss objective is generated based on the task output and the set of labels of interest. Parameters of the prompt generator are updated based on the computed loss function via backpropagation while the pretrained language model is frozen.

20 Claims, 14 Drawing Sheets

---

500

Algorithm 1 Text Classification *in-the-wild* with MODULARPROMPT.

Require: Training datasets $\mathbb{D}^{tr} = \{\mathcal{D}_1^{tr}, ..., \mathcal{D}_n^{tr}\}$, testing datasets $\mathbb{D}^{ts} = (\mathcal{D}_1^{ts}, ..., \mathcal{D}_m^{ts})$, pretrained language model $M$ 1: for $\mathcal{D}_i^{tr}$ in $\mathbb{D}^{tr}$ do ▷ Training
2:      $\Omega^{tr} \leftarrow \Omega_i^{tr}$
3:      INITIALIZE $R_{\Omega_i^{tr}}$ from $R_{\Omega_{<i}^{tr}}$ ▷ Transfer
4:      for $step = 1, ..., iter$ do
5:          UPDATE $R_{\Omega_i^{tr}}$ with SGD on $\mathcal{L}_R^{inv}(\mathcal{D}_i^{tr})$
6:      end for
7: end for
8: for $\mathcal{D}_i^{ts}$ in $\mathbb{D}^{ts}$ do ▷ Testing
9:      EVALUATE $P(\cdot | X, S = \Omega_i^{ts}, R; M)$ on $X \sim \mathcal{D}_i^{ts}$
10: end for

Algorithm 1 Text Classification *in-the-wild* with MODULARPROMPT.

Require: Training datasets $\mathbb{D}^{tr} = \{\mathcal{D}_1^{tr}, ..., \mathcal{D}_n^{tr}\}$, testing datasets $\mathbb{D}^{ts} = (\mathcal{D}_1^{ts}, ..., \mathcal{D}_m^{ts})$, pretrained language model $M$ 1: for $\mathcal{D}_i^{tr}$ in $\mathbb{D}^{tr}$ do ▷ Training
2:     $\Omega^{tr} \leftarrow \Omega_i^{tr}$
3:     INITIALIZE $R_{\Omega_i^{tr}}$ from $R_{\Omega^{tr}_{<i}}$ ▷ Transfer
4:     for $step = 1, ..., iter$ do
5:       UPDATE $R_{\Omega_i^{tr}}$ with SGD on $\mathcal{L}_R^{inv}(\mathcal{D}_i^{tr})$
6:     end for
7: end for
8: for $\mathcal{D}_i^{ts}$ in $\mathbb{D}^{ts}$ do ▷ Testing
9:     EVALUATE $P(\cdot|X, S = \Omega_i^{ts}, R; M)$ on $X \sim \mathcal{D}_i^{ts}$
10: end for

FIG. 5

| Methods | Size | News | NER | RE |
|---|---|---|---|---|
| Finetune$_{multitask}$ | 770M | 60.6±5.0 | 64.5±0.2 | 87.9±0.6 |
| Finetune | 770M | 23.0±0.6 | 25.0±2.7 | 40.8±2.2 |
| Finetune$_{EWC}$ | 770M | 22.5±1.2 | 26.6±2.8 | 45.4±3.2 |
| Finetune$_{MAS}$ | 770M | 29.2±2.9 | 25.4±2.9 | 46.2±1.8 |
| Adapter | 4.8M | 19.3±0.3 | 21.2±2.0 | 28.6±1.9 |
| Adapter$_{EWC}$ | 4.8M | 18.6±1.0 | 20.5±1.3 | 27.8±1.2 |
| Adapter$_{MAS}$ | 4.8M | 20.1±1.5 | 21.1±2.0 | 28.3±0.5 |
| PT | 0.13M | 16.1±0.3 | 18.8±0.1 | 19.6±0.1 |
| PT$_{EWC}$ | 0.13M | 16.5±0.5 | 19.0±0.5 | 20.1±0.8 |
| PT$_{MAS}$ | 0.13M | 23.8±5.9 | 29.3±4.6 | 25.1±4.9 |
| PT$_{CL}$ | 0.13M | 28.1±2.9 | 30.9±5.4 | 43.1±4.9 |
| ModularPT | 0.13M | 43.2±0.6 | 44.8±4.9 | 61.8±1.8 |

FIG. 9

| Methods | Size | News | NER | RE |
|---|---|---|---|---|
| Finetune$_{multitask}$ | 770M | 60.7±0.6 | 57.0±0.0 | 86.0±0.9 |
| Finetune | 770M | 22.4±0.5 | 24.9±2.1 | 40.7±2.1 |
| Finetune$_{EWC}$ | 770M | 22.6±1.0 | 25.1±1.7 | 45.2±3.3 |
| Finetune$_{MAS}$ | 770M | 28.8±3.3 | 23.5±1.3 | 46.9±1.9 |
| Adapter | 4.8M | 18.8±0.3 | 21.8±1.7 | 28.2±1.8 |
| Adapter$_{EWC}$ | 4.8M | 18.1±1.0 | 21.7±1.5 | 27.4±1.2 |
| Adapter$_{MAS}$ | 4.8M | 19.6±1.4 | 21.4±2.0 | 27.8±0.6 |
| PT | 0.13M | 15.7±0.2 | 19.3±0.5 | 19.6±0.2 |
| PT$_{EWC}$ | 0.13M | 16.1±0.5 | 20.0±1.0 | 20.0±0.8 |
| PT$_{MAS}$ | 0.13M | 23.7±6.2 | 25.3±3.8 | 24.9±5.1 |
| PT$_{CL}$ | 0.13M | 27.5±2.8 | 30.4±5.1 | 43.3±5.2 |
| Finetune*$_{MAS}$ | 770M | 52.8±2.2 | 25.8±1.7 | 68.1±1.3 |
| PT*$_{CL}$ | 0.13M | 57.5±5.2 | 34.3±2.4 | 65.3±2.7 |
| ModularPT | 0.13M | 74.8±1.7 | 61.6±2.2 | 82.4±0.8 |

*FIG. 10*

| Methods | Size | News | NER | RE |
|---|---|---|---|---|
| Finetune$_{multitask}$ | 770M | 60.6±5.0 | 64.5±0.2 | 87.9±0.6 |
| Finetune | 770M | 83.1±0.4 | 77.9±0.4 | 94.5±0.7 |
| Finetune$_{EWC}$ | 770M | 82.5±0.4 | 77.3±0.4 | 94.5±0.3 |
| Finetune$_{MAS}$ | 770M | 59.7±9.8 | 60.4±3.8 | 74.0±6.5 |
| Adapter | 4.8M | 81.4±0.5 | 77.4±0.4 | 94.6±0.5 |
| Adapter$_{EWC}$ | 4.8M | 81.5±0.4 | 77.3±0.4 | 94.8±0.8 |
| Adapter$_{MAS}$ | 4.8M | 81.0±0.2 | 77.2±0.5 | 94.9±0.6 |
| PT | 0.13M | 79.7±0.3 | 75.4±0.2 | 94.3±0.9 |
| PT$_{EWC}$ | 0.13M | 79.9±0.6 | 74.8±0.6 | 94.5±0.6 |
| PT$_{MAS}$ | 0.13M | 49.6±4.8 | 44.4±2.3 | 84.3±3.8 |
| ModularPT | 0.13M | 80.4±0.6 | 74.5±0.6 | 93.6±0.4 |

*FIG. 11*

| Methods | Task-agnostic | | | Task-fused | | |
|---|---|---|---|---|---|---|
| | News | NER | RE | News | NER | RE |
| MODULARPROMPT | 43.2±0.6 | 44.8±4.9 | 61.8±1.8 | 74.8±1.7 | 61.6±2.2 | 82.4±0.8 |
| w/o transfer | 35.4±2.7 | 43.0±3.6 | 54.8±2.7 | 64.9±1.7 | 57.4±2.3 | 77.5±1.2 |
| w/o subset-inv | 41.1±2.4 | 40.0±4.6 | 58.2±2.6 | 58.5±3.0 | 44.1±2.9 | 47.7±4.1 |

FIG. 12

| Methods | News | NER | RE |
|---|---|---|---|
| ModularPT | 74.8±1.7 | 61.6±2.2 | 82.4±0.8 |
| drop ground-truth label prompt | 1.5±0.5 | 4.1±0.8 | 0.5±0.4 |
| drop one random label prompt | 74.9±1.4 | 61.8±2.1 | 83.2±0.6 |
| permute label prompt order | 72.4±1.3 | 61.5±2.3 | 82.2±0.9 |

FIG. 13

Test stage 1': person {artist or author, ...}, organization {company, sports ...}

Input: person_author ... org_company ... Gilbert was a delegate to the New York State Constitutional Convention of 1894.

Predict: Gilbert | person politician ; New York State Constitutional Convention | organization government ;

Input: person_author ... org_company ... After Bert Bell 's death in October , the 33-year-old Rozelle was the surprise choice for his replacement as NFL commissioner.

Predict: Bert Bell | person athlete ; Rozelle | person athlete ; NFL | organization sports league ;

FIG. 14

SYSTEMS AND METHODS FOR TEXT CLASSIFICATION USING LABEL MODULAR PROMPTS

CROSS REFERENCE(S)

The instant application is a nonprovisional of and claim priority under 35 U.S.C. 119 to U.S. provisional application No. 63/355,476, filed Jun. 24, 2022, which is hereby expressly incorporated by reference herein in its entirety.

TECHNICAL FIELD

The embodiments relate generally to natural language processing and machine learning systems, and more specifically, to text classification using label modular prompts tuning.

BACKGROUND

Machine learning models have been widely used in different applications, such as question answering, document summarization, image recognition, and/or the like. Existing machine learning models, however, often assume training data and/or testing data is independently and identically distributed. In reality, real world data for cogitation tasks are usually more complex and involve changing contexts or non-stationary environments. In particular, performance of natural language processing (NLP) models can often be limited due to this challenge, because finetuning an NLP model for each specific NLP task is largely impractical and, in some cases, infeasible.

Therefore, there is a need to improve adaptability of NLP models in varying data environments.

BRIEF DESCRIPTION OF THE DRAWINGS

FIG. 5 is an example pseudocode illustrating a method for performing label modular prompt tuning, according to one or more embodiments described herein.

FIGS. 9-14 provide example data tables and experimental results illustrating example data performance of the label modular prompt tuning framework described in relation to FIGS. 1-8, according to some embodiments described herein In the FIGURES, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Natural language processing (NLP) has received a significant boost in performance by employing large-scale pretrained language models (PLMs). However, the varying data environment of training data and/or testing data may significantly impact the performance of NLP models. Finetuning a dedicated model for each task is not always practical or even feasible. While some models have been implemented with parameter-efficient prompt tuning, such approaches assume independently and identically distributed (i.i.d.) data during training and testing. Practical cognitive tasks in the real world are typically more complex and involve changing contexts or non-stationary environments.

In view of the need to improve adaptability of NLP models in varying data environments, embodiments presented herein provide a label-modular prompt tuning framework (also referred to as modular prompt framework) for text classification tasks. Specifically, a novel text classification in-the-wild task is formulated, which emulates the transient learning environment of real world. For example, for a service requiring classification, the label set might gradually change over time to include new labels or remove obsolete ones. Such scenarios typically result in a sequence of non-stationary low-resource training and evaluations over different label sets (e.g., training on (chemistry, physics) and (basketball, football) in succession and then test on {physics, football}). Label-modular prompt tuning is performed to decompose the prompt sequence into label-modular components called label prompts. Each encoding task-specific knowledge corresponding to a class label. In each forward pass, desired label prompts are selected to construct the input prompt to the pretrained language model, based on the target label-set. To ensure that the learned knowledge is encoded in a modular fashion during training, a novel subset-invariant loss over dynamic label-sets is used.

Figure 1:
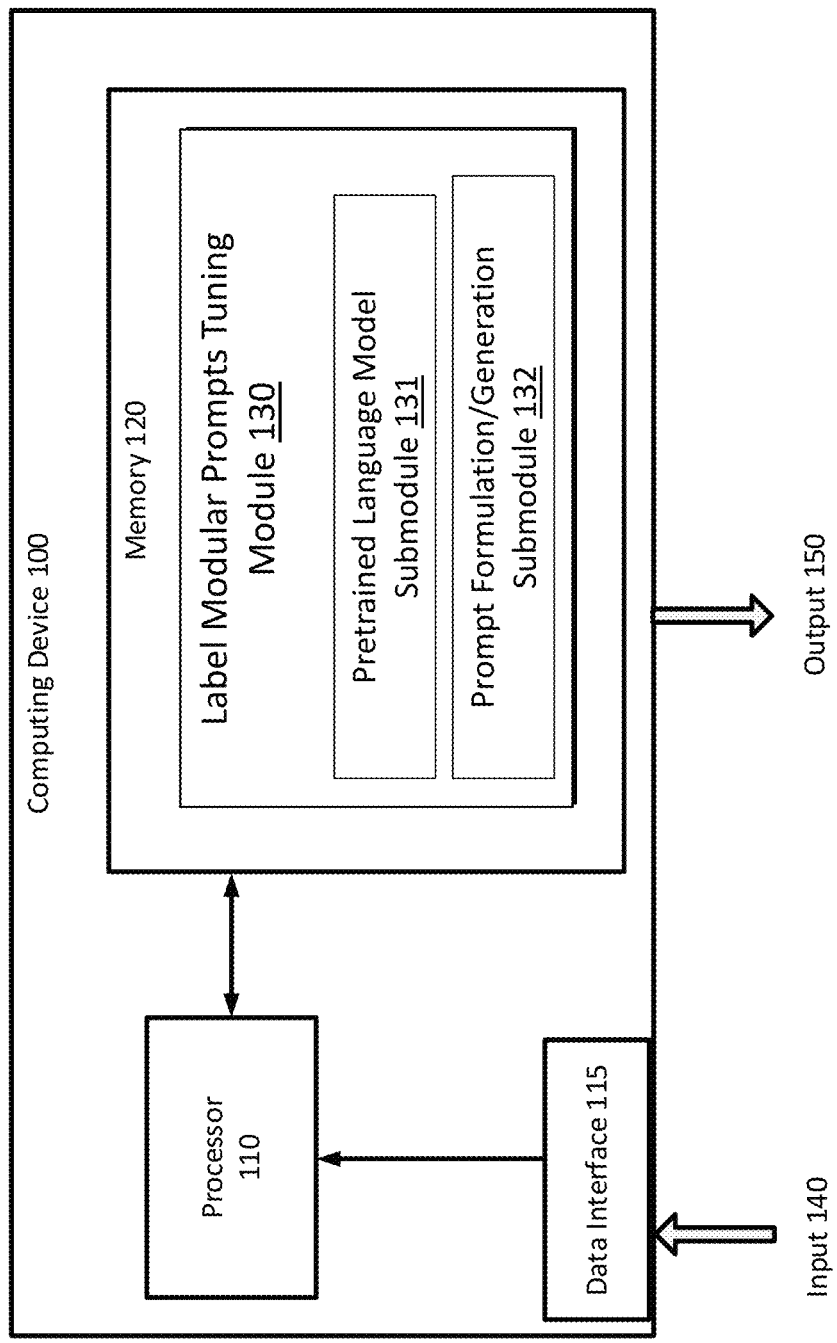
FIG. 1 is a simplified block diagram illustrating a computing device implementing the label-modular prompt tuning framework described in FIG. 1, according to some embodiments.

FIG. 1 is a simplified diagram of a computing device 200 for implementing a label modular prompts tuning model, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a label modular prompt tuning module 130 that may be used to implement and/or emulate the systems and models, and/or to implement any of the methods described further herein. A trained label modular prompt tuning module 130 may receive input 140 that includes text, such as a sentence, via the data interface 115 and generate a pairing of identified entities and entity types as output 150.

In some embodiments, the label modular prompt tuning module 130 includes a pretrained language model (PLM) submodule 131 and a prompt formulation submodule 132 (also referred to as a prompt generator submodule 132).

In one embodiment, the label modular prompt tuning module 130 and its submodules 131-132 may be implemented by hardware, software and/or a combination thereof.

Figure 2:
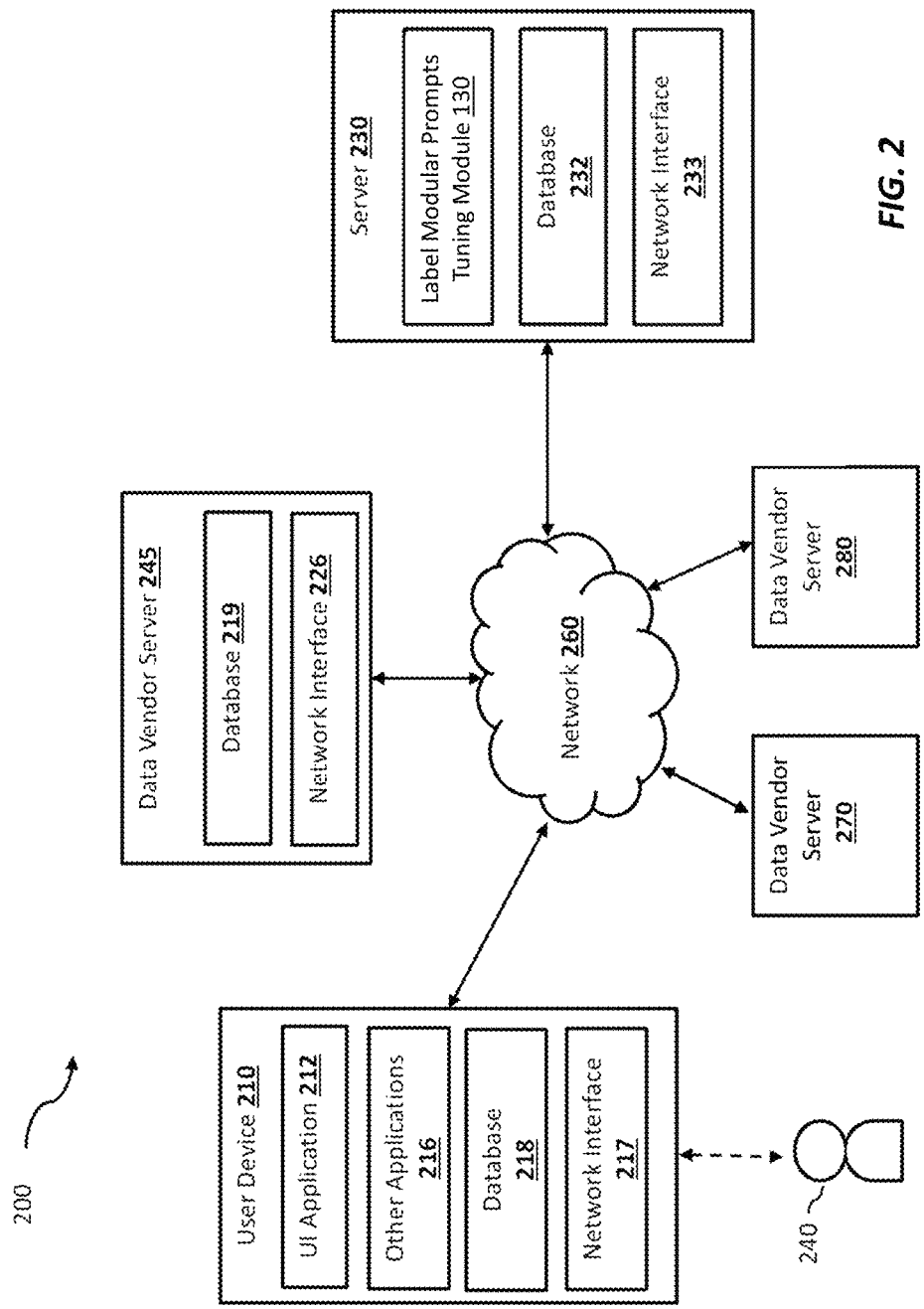
FIG. 2 is a simplified block diagram of a networked system suitable for implementing the label-modular model framework described in FIG. 1 and other embodiments described herein.

FIG. 2 is a simplified block diagram of a networked system suitable for implementing the label modular prompts tuning framework described in FIG. 1 and other embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a prediction result message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view predictions generated for input.

User device 210 may further include database 218 stored in a transitory and/or non-transitory memory of user device 213, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 226 adapted to communicate with data vendor server 245 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases to provide training datasets including label prompts to the server 230. The database may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

The server 230 may be housed with the label modular prompt tuning module 130 and its submodules described in FIG. 1. In some implementations, module 230 may receive data from database 219 at the data vendor server 245 via the network 260 to generate entity types for the input. The generated entity types may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of the label modular prompt tuning module 130. In one implementation, the database 232 may store previously generated entity types, and the corresponding input feature vectors.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 235, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Finetuning all parameter weights of a PLM on a downstream task can be prohibitively expensive, especially given the growing sizes of PLMs. Instead of finetuning language models for each downstream task, prompt models may be used to modulate a frozen PLM for a downstream task, by updating only a small set of parameters of the prompt model. For example, the input text may be prepended with a prompt. However, the conventional prompt tuning method is considered modular at the task level, because it often learns soft prompts for each task, and is not able to learn label modular decomposition within a particular task. As such, the conventional prompt tuning method fails to address challenges with text classification in-the-wild (e.g., training tasks of different label sets in succession of training stages and testing/performing inference on a task with labels across multiple training stages), which emulates the transient learning environment of real world. An example of text classification in-the-wild is to train on {chemistry, physics} and {basketball, football} in succession, and then test on {physics, football}. For conventional prompt tuning methods, text classification in-the-wild is challenging to handle, as text classification in-the-wild requires combining partial information from different label spaces.

To address the challenges of text classification in-the-wild these objectives, a label modular prompt tuning framework (also referred to as label modular prompt framework) is described. In contrast to conventional prompt tuning methods, the label-modular approach may learn exclusive knowledge for each label and generalize to any subset of the label set. The label-modular model has the following main objectives:

Objective 1. Separable Label Representation: Each class label has its own representation which compactly encodes the information from the data belonging to that label.

Objective 2. Prediction over Controllable Label Space: Models perform robustly over any subset of the learnt label space during inference.

To achieve the objectives, the label modular prompt tuning framework decomposes the prompt sequence into label-modular components called label prompts. Each label prompt encodes task-specific knowledge corresponding to a class label. Thus, in each forward pass, desired label prompts are selected to construct the input prompt, based on the target label set. To ensure that the learned knowledge is encoded in a modular fashion during training, a novel subset-invariant loss over dynamic label-sets is used.

Next problem definition for text classification in-the-wild is provided. First a standard single domain text classification is used. Specifically, assume a single text classification domain (or dataset) D. Let (X, Y)~D be a sample, where $X=\{x_t\}_{t=1}^{L}$ represents a text input sequence of length L and $Y=\{y_t\}_{t=1}^{M}$ represents the corresponding classification label name of length M (in tokens). Let $\Omega$ denote the set of all possible class labels of interest, for which $\forall (X, Y)$~D, cls $(Y) \subseteq \Omega$. Note that cls(Y) is a mapping which returns the class label (s) in Y. In case of single class classification, cls(Y) returns {Y}. In case of sequence labelling which is token level classification, cls(Y) returns the set of all unique target tags in Y.

For the problem of text classification in-the-wild, assume a sequence of n text classification tasks with the corresponding training datasets $\mathbb{D}^{tr} = \{D_1^{tr}, \ldots, D_n^{tr}\}$, with $(X_k, Y_k) \sim D_k^{tr}$ denoting a sample at the k-th training stage and $\Omega_k$ denoting the set of all possible class labels for $D_k^{tr}$. Similarly, the testing could consist of m such datasets $D^{ts} = (D_1^{ts}, \ldots, D_m^{ts})$ with $\Omega_j^{ts}$ denoting the set of possible class labels for $D_j^{ts}$.

For classification in-the-wild, three challenging yet very practical settings are examined for validation. The three test settings are described in detail below, and are also referred to as the classification in-the-wild test settings.

First setting: When m=1 and $\Omega_1^{ts} = \cup_{k=1}^n \{\Omega_k^{tr}\}$, one test dataset may cover all seen labels. This setting is referred to as task-agnostic testing, as the test label may come from any of the training stages (or tasks).

Second setting: When m=n and $\Omega_j^{tr}, \forall j=\{1, \ldots, n\}$, one test dataset may correspond to each training stage with the same label set. This setting is referred to as task-specific testing, as each test set evaluates the model's performance on a particular task in which it was trained.

Third setting: The third setting is a more challenging setting where m>1 and $\Omega_j^{ts} \notin \{\Omega_1^{tr}, \ldots, \Omega_n^{tr}\}, \forall j = \{1, \ldots, m\}$ rather $\Omega_j^{ts} \in P(\cup_{k=1}^n \{\Omega_k^{tr}\}) - \cup_{i=1}^n \{P(\Omega_i^{tr})\}$, where P(S) denotes the power-set of a given set S. That is, the label set of a test stage does not correspond to any one training stage, but is generated using partial label sets from multiple training stages (or tasks). This setting is referred to as task-fused testing. Note that the task-agnostic and task-specific scenarios are related to continual learning, but the latter considers access to task-id instead of intra-task information (i.e., task label set).

Soft prompt timing is described next. Let $X = \{x_1, \ldots, x_L\}$ be an input text sequence, where $x_t$ is the t-th token, and M be a pretrained language model. The input text is mapped to a sequence of embeddings $H = \{h_1, \ldots, h_L\}$ with $h_t \in \mathbb{R}^d$. A soft prompt is a sequence of n tunable soft tokens $T = \{p_1, \ldots p_N\}$ with $p_i \in \mathbb{R}^d$, that is concatenated with the text embedding as the final input to $M: \overline{H} = \{T \oplus H\} = \{p_1, \ldots, p_N, h_1, \ldots, h_L\}$.

The model prediction may be defined as $P(Y|\overline{H}; M) = P(Y|T, X; M)$. During training, M is kept frozen and only T is updated.

Figure 3:
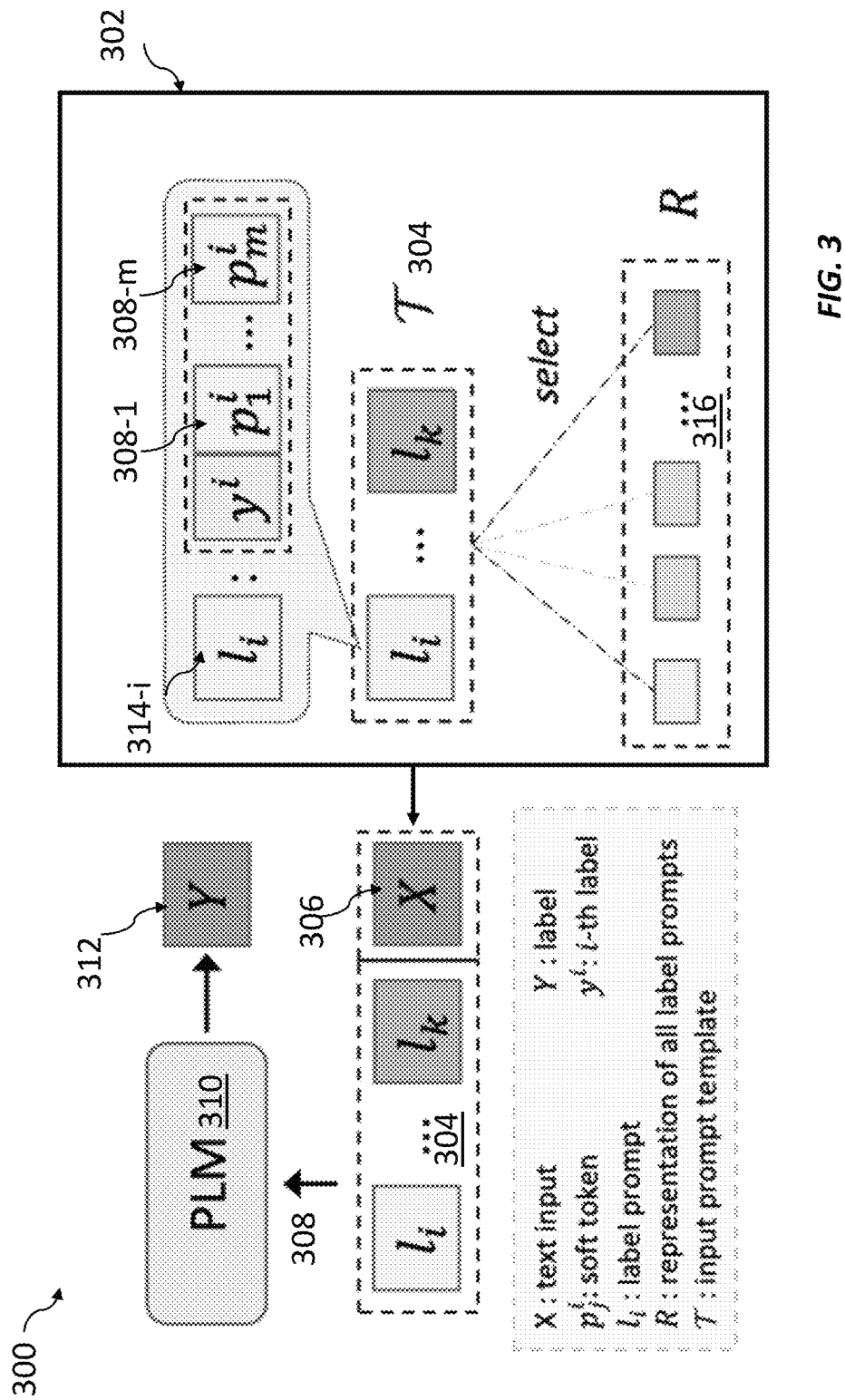
FIG. 3 is a simplified diagram illustrating an example framework of label modular prompt tuning models, according to one or more embodiments described herein.

Referring to FIG. 3, an example label modular prompt framework 300 is illustrated. As shown in FIG. 3, the label modular prompt framework 300 includes a label modular prompt generator 302, which generates a label modular prompt 304 for a text input 306 (denoted as X). An input 308 for the PLM 310 is generated by prepending the text input 306 with the prompt 304, and the PLM 310 generates a task output 312 (denoted as Y) in response to the input text 306.

Specifically, the label modular prompt generator 302 determines the representations of all label prompts 316 (denoted as R). The label modular prompt generator 302 selects a set of labels of interest (denoted as S) from the representations of all label prompts 316. For each label of the set of labels of interest S, the label modular prompt generator 302 generates a corresponding label prompt (e.g., 314-i, denoted as $l_i$). The label modular prompt 304 includes of a sequence of label prompts 314-i (denoted as $l_i$) through 314-k (denoted as $l_k$). The prompt 304 may be denoted as $T = \oplus_{i \in S} l_i$, with S being the set of labels of interest selected from representations of all label prompts 316 (denoted as R).

In various embodiments, each label prompt (e.g., 314-i $l_i$) may include the corresponding label name (denoted as $y^i$) and a sequence of tunable soft tokens (e.g., $p_1^i, \ldots, p_m^i$). As an example, the $i^{th}$ label prompt 314-i may be generated as $l_i = e_i \oplus \{p_1^i, \ldots, p_m^i\}$, where $e_i$ is the embedding of label i text or sequence of token-embeddings for multi-token labels, $\oplus$ denotes concatenation, and m is the number of tunable soft tokens (soft tokens 308-1 through 308-m) per label prompt. The soft tokens (e.g., $p_1^i, \ldots, p_m^i$) may be tuned using parameters associated with the soft tokens by the label modular prompt generator 302. For example, the system may store each label prompt (including soft tokens $p_1^i, \ldots, p_m^i$), and tunes on those tokens directly (e.g., during backpropagation in a training process based on the loss objective). The final prompt 304 may be denoted as $T = \alpha_{i \in S} l_i$, with S being the set of labels of interest selected from representations of all possible label prompts 316 (denoted as R).

Figure 4:
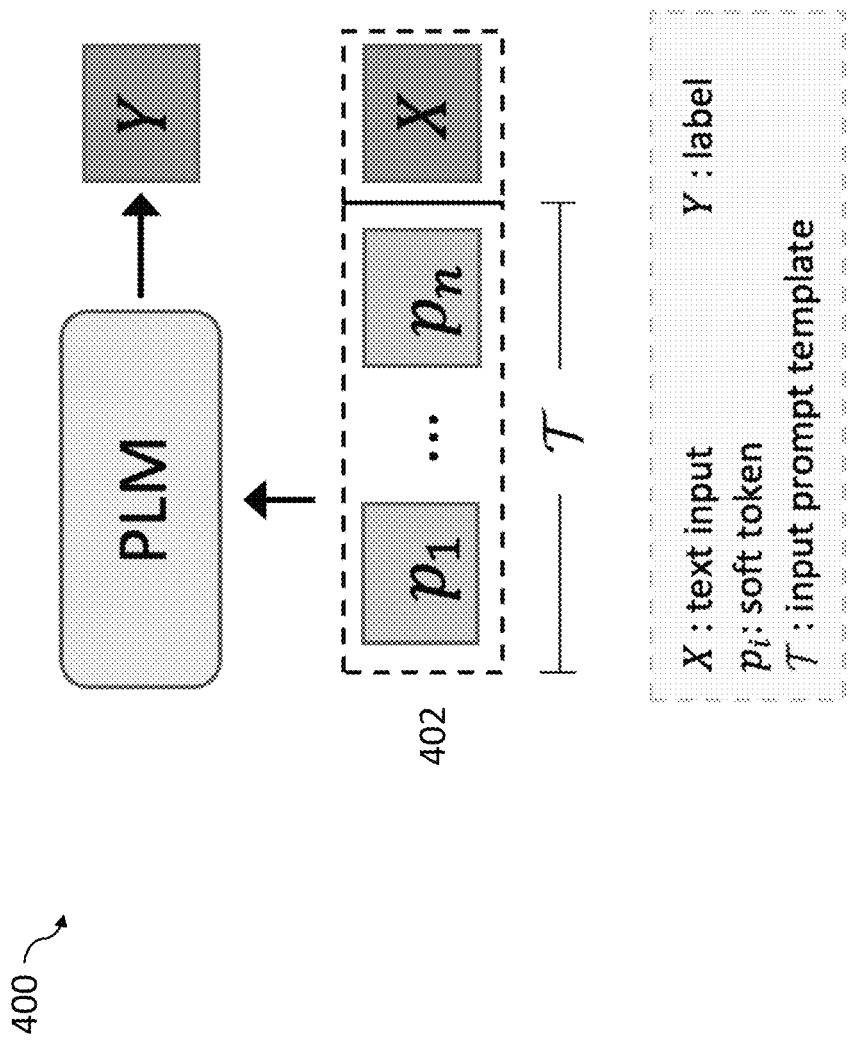
FIG. 4 is a simplified diagram prompt tuning framework without using label modular prompt tuning models, according to one or more embodiments described herein.

For comparison, an architecture of a conventional prompt tuning framework 400 is illustrated in FIG. 4. As shown in FIG. 4, prompt 402 in prompt tuning framework 400 only includes soft tokens $p_1$ through $p_n$, and does not include a sequence of label prompts as discussed with reference to label modular prompt framework 300.

Comparing the frameworks of FIGS. 3 and 4, one key process of label modular prompt framework 300 is prompt formulation (e.g., performed by prompt formulation sub-module 132, also referred to as prompt generator submodule 132), denoted as $\{R, S\} \rightarrow T$, where R denotes the learned representation space of all labels prompts. In comparison, conventional prompt tuning framework 400 does not use variables S and R, and the model training tunes T directly.

Referring back to FIG. 3, in label modular prompt framework 300, given S as a set of class labels of interest, the corresponding label prompts representations are selected from R, which are then concatenated to form the final input prompt T. In various embodiments, the training loss is back-propagated through $Y \rightarrow T \rightarrow R$ to learn the soft label prompts.

In various embodiments, the label modular prompt framework 300 may use a subset invariant loss to achieve Objective 2 (prediction over controllable label space) in prompt formulation (e.g., $\{R, S\} \rightarrow T$). In single domain setting, $\Omega^{tr}$ is the set of all possible class labels during training as defined above. However fixing S to a constant $\Omega^{tr}$ throughout training may make the model susceptible to data discrepancy between training and inference as $\Omega^{ts} \neq \Omega^{tr}$. To achieve Objective 2, S may be varied during training. First the size of S, denoted as $|S|$, may be uniformly sample from $\{1, \ldots, (|\Omega^{tr}|-1)\}$. Then $|S|$ labels are randomly chosen from $\Omega^{tr}$ to construct S. Such sub-sampling of $\Omega^{tr}$ encourages a fair exploration of different lengths of prompt sequences as input during training, thus enabling representations to be robust to a dynamic $\Omega^{ts}$ at inference.

For each training instance, with probability p, $S = \Omega^{tr}$ is fixed. S is varied as above with (1−p) chance. Such sampling process is referred to as $S \sim \hat{S}$. The subset invariant loss is then defined as:

$$L_R^{inv}(D) = \mathbb{E}_{\substack{(X,Y) \sim D \\ S \sim \hat{S}}} \left[ -\mathbb{1}_{cls(Y) \subseteq S} \log P(Y \mid X, R, S; M) \right], \quad (1)$$

where $\mathbb{1}$ is the Indicator function; $\mathbb{1}_{cls(Y)\subseteq S}=1$ if cls (Y)⊆S, otherwise 0. According to Objective 1 (Separable Label Representation), the model is expected to make predictions grounded by the relevant label prompts. When S does not contain ground truth class label(s) in Y, the model should not be able to predict Y as output. Thus the loss is set to be zero when cls (Y)⊆S to avoid encouraging ungrounded predictions.

Referring to FIG. 5, illustrated is pseudocode for method 500 for performing label modular prompt tuning under the continual learning setting. To verify Objective 2, the label modular prompt model is examined under text classification in-the-wild as defined previously. Given training datasets $D^{tr}=\{D_1^{tr}, \ldots, D_n^{tr}\}$, the model is trained on each dataset $D_i^{tr}$ sequentially, and then evaluated on three classification in-the-wild testing settings.

As shown in line 3, method 500 includes a label prompt transfer process. $R_{\Omega_i^{tr}}$ in line 3 denotes label prompt representation of labels in $\Omega_i^{tr}$, i.e. $R_{\Omega_i^{tr}}:=\{l_k \in R | k \in \Omega_i^{tr}$ and $R_{\Omega_{<i}^{tr}}\}$ is similarly defined as $$R_{\Omega_{<i}^{tr}} := \left\{l_m \in R \mid m \in \bigcup_{t<i} \Omega_t^{tr}\right\}.$$

In line 3, for learning the label prompt representation $R_{\Omega_i^{tr}}$ at any training stage i, it is aimed to transfer the label-modular knowledge, $R_{\Omega_{<i}^{tr}}$, learned over the previous training stages through prompt initialization. This is a unique learning characteristic, which is facilitated by the label-modular architecture. It allows the model to exploit semantic relatedness between labels across training stages when initializing the label prompt representation.

To illustrate the label prompt transfer process, intuitively, if 'bistro'$\in \Omega_{<i}^{tr}$ and 'restaurant'$\in \Omega_i^{tr}$, then initializing the label prompt representation of 'restaurant' with the knowledge encoded in the learned label prompt representation of 'bistro' may be helpful to the model. To compute the similarity between labels $l_j$ and $l_k$ with $j \in \Omega_i^{tr}$ and $k \in \Omega_{<i}^{tr}$, per-token average cosine similarity $sim(e_j, e_k)$ based on the embeddings of the label texts may be used. For each label $j \in \Omega_i^{tr}$, the top-K most similar labels $\Omega_{top-K(j)}^{tr} \subset \Omega_{<i}^{tr}$ are selected. $l_j$ may be initialized by averaging the top-K similar label prompt representations, weighted by their normalized similarity score:

$$l_j \leftarrow \sum\nolimits_{k \in \Omega_{top-K(j)}^{tr}} \alpha_k l_k,$$

where $$\alpha_k = sim(e_j e_k) / \sum\nolimits_{m \in \Omega_{top-K(j)}^{tr}} sim(e_j e_m).$$

Compared to a conventional transfer method by Vu (Tu Vu, Brian Lester, Noah Constant, Rami Al-Rfou', and Daniel Cer. 2022, "Spot: Better frozen model adaptation through soft prompt transfer," ACL (1), pages 5039-5059, Association for Computational Linguistics), which shows transfer for task level prompts with training overheads, here in the label modular prompt model, transfer at a finer-grained level over label prompts is performed with no overheads.

Figure 6:
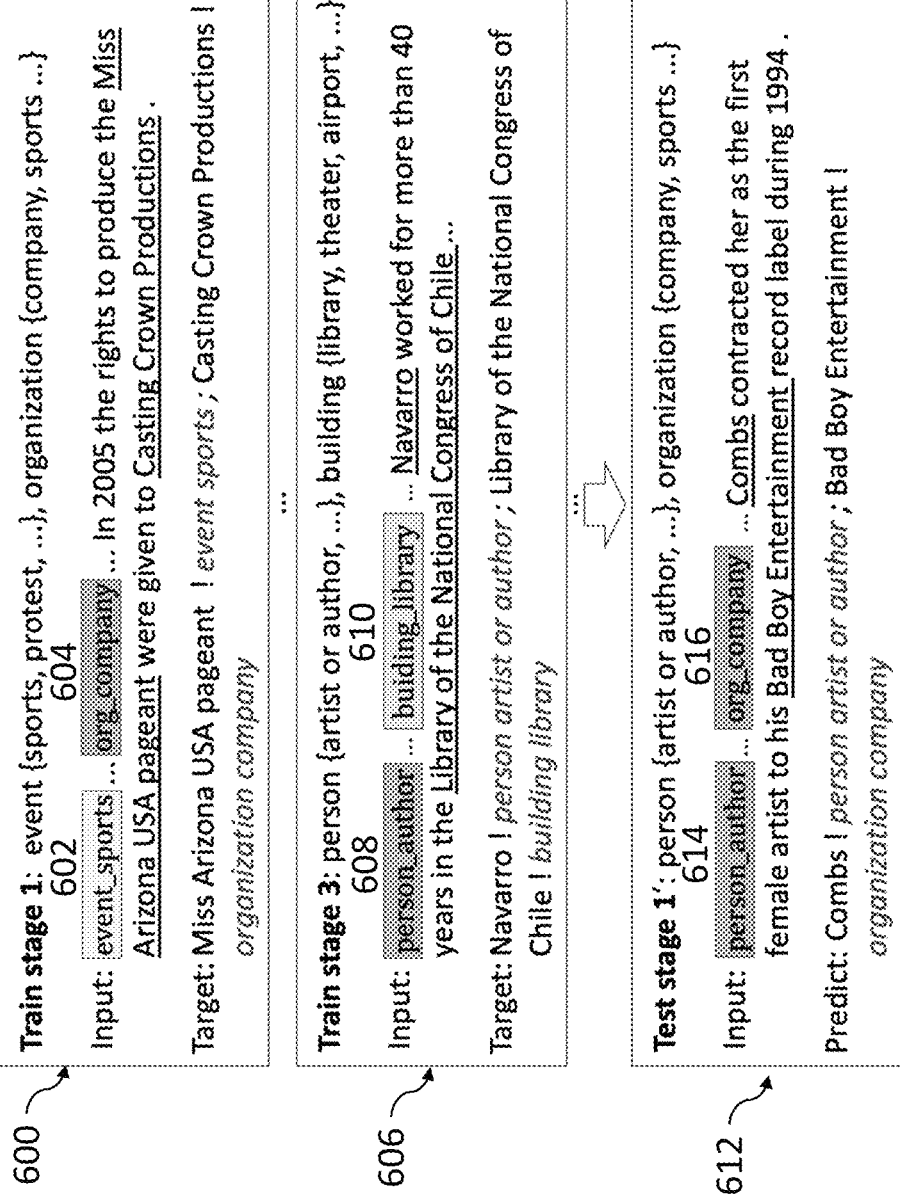
FIG. 6 illustrates example training stages and inference test stage performed using the label-modular model framework, according to one or more embodiments described herein.

Referring to FIG. 6, an example of the training stages and test/inference stage of the label modular prompt tuning frame on a task-fused Named Entity Recognition (NER) setting is illustrated. To evaluate the generalizability of the label modular prompt tuning framework, some practical scenarios of text classification in-the-wild are constructed. The training is performed in multiple stages over non-overlapping label spaces, and the model is evaluated on label-sets that (i) correspond to each training stage (task-specific), (ii) is accumulated over all learned labels (task-agnostic), and/or (iii) is comprised of labels across multiple training stages (task-fused).

In the example of FIG. 6, as shown in block 600, training stage 1 covers entity types (e.g., event, organization), and the possible labels include various labels related to these entity types (e.g., event_sports, event_protest, organization_company, organization_sports, etc.). An example input includes label prompt 602 for label "event_sports" and label prompt 604 for label "org_company." Label prompts 602 and 604 in the input are exemplary, and the input may include other label prompts (e.g., event_protest, organization_sports, etc.) for labels selected from the possible labels. The target includes entities ("Miss Arizona USA pageant" and "Casting Crown Productions") with corresponding labels ("event sports" and "organization company").

As shown in block 606, training stage 3 performed after training stage 1 and training stage 2 covers entity types/labels different from those covered at training stages 1 and 2. In various embodiments, at training stage 3, the possible labels include various labels related to "person" and "building" (e.g., "person_artist or author," "building_library," "building_theater," "building_airport," etc.) and the possible labels from the previous training stages 1 and 2. An example the input includes label prompt 608 for label "person_author" and label prompt 610 for label "building_library". Label prompts 608 and 610 in the input are exemplary, and the input may include other label prompts (e.g., "event_protest," "organization_sports," "building_theater," etc.) for labels selected from the possible labels. The target includes entities ("Navarro" and "Library of the National Congress of Chile") with corresponding labels ("person artist or author" and "building library").

In the example of FIG. 6, as shown in block 612, a fused inference test stage ("Test Stage 1") is used. The fused test stage covers fused entity types including both person (e.g., covered by training stage 3) and organization (e.g., covered by training stage 1). The input includes label prompts for all possible labels from all training stages, including e.g., label prompt 614 for label "person_author" and label prompt 616 for label "org_company." The prediction generated by the PLM includes entities ("Combs" and "Bad Boy Entertainment") with corresponding labels ("person artist or author" and "organization company.").

Figure 7A:
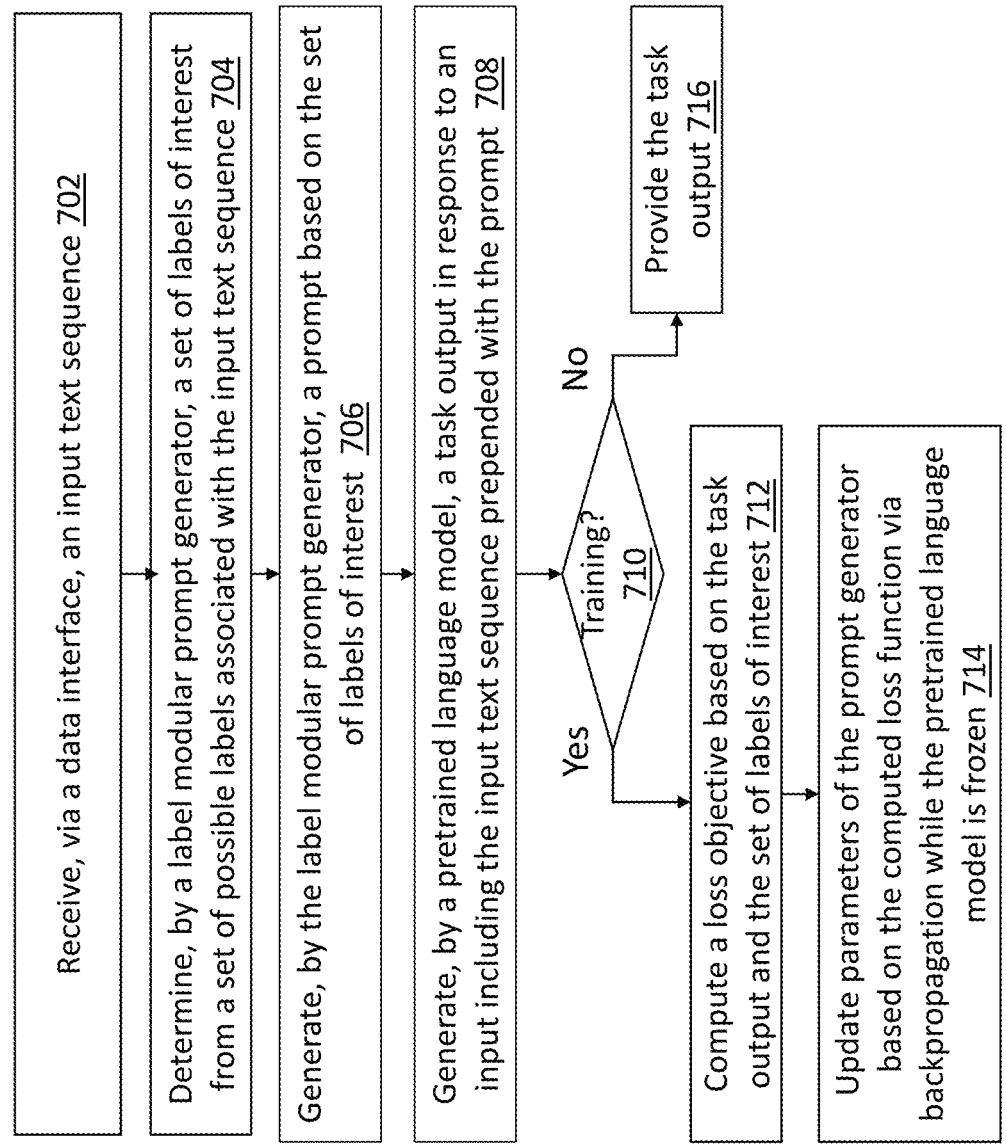
FIG. 7A is an example logic flow diagram illustrating a method of providing label modular prompt tuning, according to some embodiments described herein.

Referring to FIG. 7A, an example method 700 of label modular prompt tuning is illustrated. Method 700 may begin at process 702, where an input text sequence is received through a data interface. In the example of FIG. 6, as shown in block 600 at training stage 1, an input text sequence includes "In 2005 the rights to produce the Miss Arizona USA pageant were given to Casting Crown Productions." As shown in block 606 at training stage 3, an input text sequence includes "Navarro worked for more than 50 years in the Library of the National Congress of Chile . . . " As shown in block 612 at Inference/Test stage 1, an input text sequence includes "Combs contracted her as the first female artist to his Bad Boy Entertainment record label during 1994."

Method 700 may proceed to process 704, where a label modular prompt generator may determine a set of labels of interest from a set of possible labels associated with the input text sequence. During training, the set of possible labels include all possible labels from the current training stage and all preceding training stages. As shown in block 600, at training stage 1, the set of possible labels includes the possible labels associated with training stage 1, including labels associated with "event" and "organizations." As shown in block 606 at training stage 3, the set of possible labels includes the possible labels associated with training stages 1, 2, and 3, including labels associated with "event," "organization," "person," and "building." During training, the label modular prompt generator may then determine a set of labels of interest of a varying size from the set of possible labels using a sampling process.

As shown in block 612, during inference/testing, the set of labels of interest is the same as the set of possible labels, which includes all possible labels from all training stages.

Method 700 may proceed to process 706, where the label modular prompt generator may generate a prompt based on the set of labels of interest. As discussed in detail above with reference to FIG. 3 and below with reference to FIG. 7B, the label modular prompt generator may generate a plurality of label prompts for the corresponding set of labels of interest. Each label prompt includes a label name and a sequence of soft tokens generated based on representations associated with the class label. The soft tokens are tunable by tuning the corresponding plurality of parameters of the label modular prompt generator.

Method 700 may proceed to process 708, where an input including the input text sequence prepended with the prompt is sent to a pretrained language model. The pretrained language model then generates a task output (e.g., named-entity recognition results in the example of FIG. 6) in response to the input.

Method 700 may proceed to process 710 to determine whether the label modular prompt tuning method is operating during a training stage or an inference stage.

At process 712, after determining that the label modular prompt tuning method, a loss objective is computed based on the task output and the set of labels of interest. An example subset invariant loss as provided in formula (1) may be used accommodating the varying set of labels of interest during training.

At process 714, the label prompts including the corresponding soft tokens (e.g., $p_1^i, \ldots, p_m^i$) are updated by updating parameters of the soft tokens by the label modular prompt generator, based on the computed loss function via backpropagation while the pretrained language model is frozen. For example, at process 714, representations of the all label prompts R and soft tokens determined using R may be updated with stochastic gradient descent (SGD) on the computed loss function.

In embodiments where at process 710 it is determined that the label modular prompt tuning method is operating during an inference stage, method 700 proceeds to process 716, where the task output is provided. In the example of FIG. 6, as shown in block 612 at Inference/Test stage 1, a prediction of "Combs" as "person artist or author" and "Bad Boy Entertainment" as "organization company" is provided.

Figure 7B:
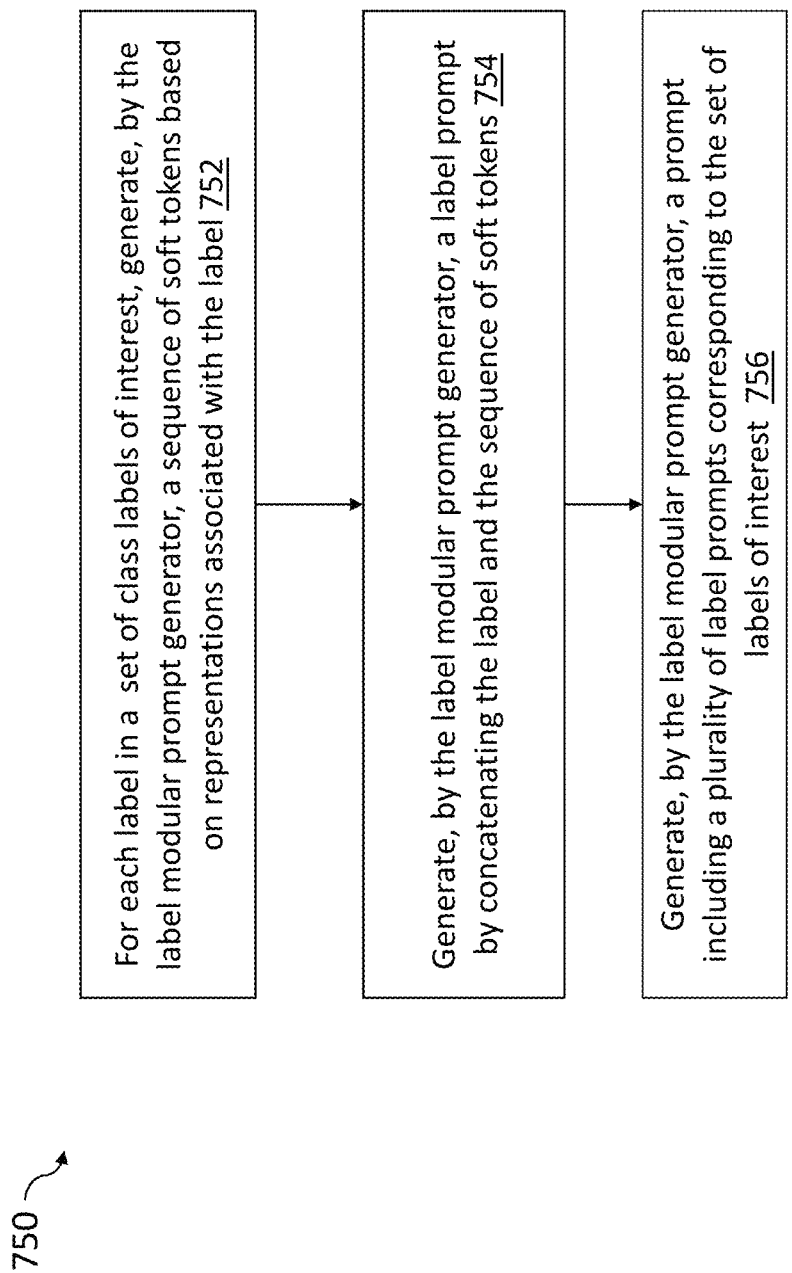
FIG. 7B is an example logic flow diagram illustrating a method of generating a prompt by a label modular prompt generator of the label modular prompt tuning framework, according to some embodiments described herein.

Referring to FIG. 7B, an example method 750 for generating a label modular prompt (e.g., at process 706 of method 700) is illustrated. Method 750 may begin at process 752, For each label in a set of class labels of interest, the label modular prompt generator may generate a sequence of soft tokens based on representations associated with the label. Method 750 may proceed to process 754, where for each label, the label modular prompt generator may generate a label prompt by concatenating the label and the sequence of soft tokens. Method 750 may proceed to process 756, where the label modular prompt generator may generate a prompt including a plurality of label prompts corresponding to the set of labels of interest.

Figure 8:
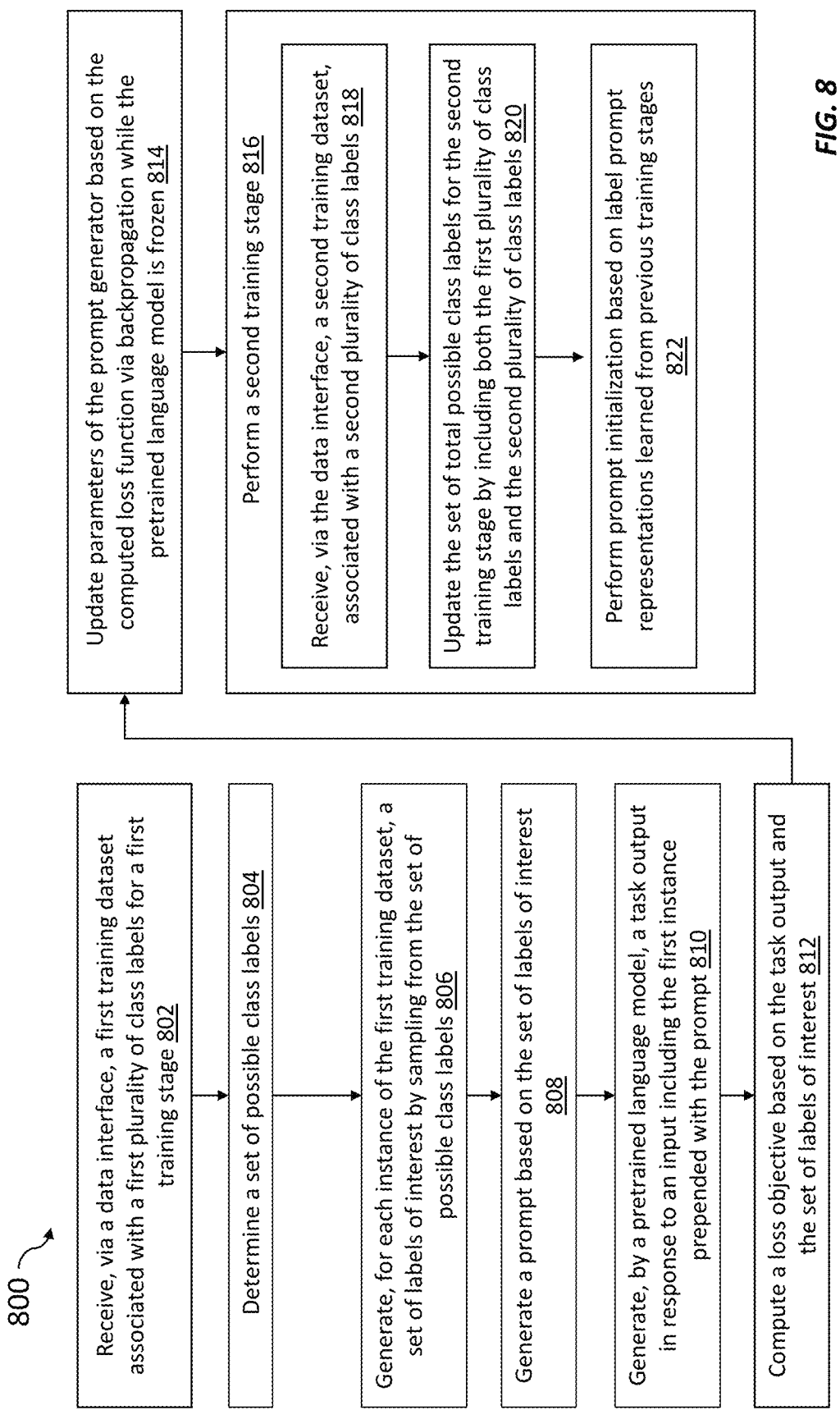
FIG. 8 is an example logic flow diagram illustrating a method of performing subsequent training processes using the label-modular model framework, according to some embodiments described herein.

Referring to FIG. 8, an example method 800 of training the label modular prompt framework with a sequence of training stages is illustrated. During the training, a prompt is generated based on a set of class labels of interest, which varies during the training. A subset invariant loss is used to accommodate the varying set of class labels of interest. In various embodiments where the training includes subsequent training stages, the label space is expanded to include all labels of the current training stage and the previous training stage(s). Furthermore, label prompt transfer may be performed for learning the label prompt representation at any training stage i, where the label-modular knowledge learned over the previous training stages are transferred through prompt initialization.

Method 800 may begin at process 802, where a first training dataset associated with a first plurality of class labels for a first training stage is received via a data interface. Method 800 may proceed to process 804, where a label modular prompt generator determines the set of all possible class labels by including the first plurality of class labels. Method 800 may proceed to process 806, where the label modular prompt generator generates, for each instance of the first training dataset, a set of labels of interest by sampling from the set of possible class labels. In other words, the set of labels of interest in each forward pass of the training process may be different. Method 800 may proceed to process 808, where the label modular prompt generator generates a prompt based on the set of labels of interest (e.g., as described with reference to FIGS. 3 and 7B). Method 800 may proceed to process 810, where a pretrained language model generates a task output in response to an input including the first instance prepended with the prompt. At process 812, a loss objective based on the task output and the set of labels of interest. In various embodiments, the loss objective is a subset invariant loss accommodating the varying set of labels of interest. At process 814, parameters of the prompt generator are updated based on the computed loss function via back-propagation while the PLM is frozen, thereby updating the representations R and the tunable soft tokens of the label prompts.

Method 800 may proceed to process 816 where a second training stage is performed. The second training stage is substantially similar to the first training stage except the differences described below. During the second training stage, at process 818, a second training dataset associated with a second plurality of class labels is received, e.g., via the data interface. At process 820, the set of total possible class labels for the second training stage is updated by including both the first plurality of class labels of the first training stage and the second plurality of class labels. At process 822, prompt initiation is performed based on the label prompt representations learned from the previous training stages.

Referring to FIGS. 9-18, experiments and performance of the label modular prompt tuning framework are discussed. For evaluation, the task-agnostic and task-fused settings are the most challenging scenarios for typical fine-tuned or prompt-tuned models. On those settings, as shown in the experiments below, the label modular prompt tuning framework (labeled as ModularPT) outperforms all relevant baselines by a significant margin. This illustrates the label modular prompt tuning framework's ability to learn robust prompt representations that is generalizable to different non-stationary learning environments. Further, it is empirically justified that the label modular prompt tuning framework showcases label modular properties, by analyzing its behavior when either the ground truth or other random labels are removed from the input or the order of label prompts is permuted.

Datasets used and data construction process, relevant baselines, evaluation methods, and implementation details will be described below. Analysis based on the experiments are also provided to address various questions, including: 1. Can the label modular prompt tuning framework consolidate knowledge over multi-stage training? 2. Can the label modular prompt tuning framework adapt to dynamic label space at inference? 3. How competitive is the label modular prompt tuning framework in task-specific setting? Additionally, ablations and quantitative and qualitative analysis are performed to verify the label modular properties of the label modular prompt tuning framework.

Tasks and Datasets

Experiments are conducted on three types of NLP tasks: News Domain Classification on Huffpost-News (Rishabh Misra, 2018, News category dataset), Name Entity Recognition (NER) on fewNERD (Ding et al., 2021, Few-nerd: A few-shot named entity recognition dataset In ACL/IJCNLP (1), pages 3198-3213, Association for Computational Linguistics2021), and Relation Extraction (RE) on FewRel (Han et al., 2018, Fewrel: A large-scale supervised few-shot relation classification dataset with state-of-the-art evaluation, In EMNLP, pages 4803-4809. Association for Computational Linguistics). All tasks are formulated as a text-to-text problem. For News Domain Classification and NER, target text is constructed following Qin and Joty (2021, LFPTS: A unified framework for lifelong few-shot language learning based on prompt tuning of T5, CoRR, abs/2110.07298). For RE, the original text, source entity, separator token 'l' and target entity are concatenated as an input sequence, and use the relation type as the target.

For HuffpostNews, 100 shots are subsampled per class for training and validation and split it into 5 stages of disjoint labels. For FewNERD and FewRel, 50 shots are subsampled for training and validation and split into 4 and 5 stages, respectively. For testing, 200, 50, and 50 shots are subsampled per class for HuffpostNews, FewNERD and FewRel, respectively. The total number of labels for {HuffpostNews, FewNERD, FewRel} is {41, 64, 80} respectively, and resulting label size per stage is {8-9, 16, 16} respectively.

For task-specific testing, the stages defined for training are followed to construct a corresponding test data for each stage. For task-agnostic testing, task-specific test data for current stage and all previously seen stages are combined to construct the test data. For task-fused testing, label-sets are constructed for each fused stage such that it is not a subset of any single prior training stage, but rather contains labels from "all" prior training stages. In an example, the training stages include {A,B}→{C,D}→{E,F}, where each bracket denotes a stage (with label set), and the labels inside bracket denotes the label classes. In an example, the task-agnostic test stage is {A,B,C,D,E,F}, and the task-fused test stages may include be {A,C,E}, {B,D,F} (task-fused stages can also be {A,D,F}, {B,C,E}, etc). As such, task-fused test stages require partial knowledge from multiple training stages. For {Huff-postNews, FewNERD, FewRel}, {fifteen (15), four (4), fifty one (51)} fused stages are constructed respectively. Five (5) randomized trials are conducted with different data sampling and experiment seed for all of the above settings.

Baseline

T5-large (Raffel et al., 2020, Exploring the limits of transfer learning with a unified text-to-text transformer, J. Mach. Learn. Res., 21:140:1-140:67) is used as the backbone PLM for all methods. The following baselines are used to compare with the label modular prompt tuning framework: ModelTuning (labeled as finetune), which tunes all parameters of the backbone PLM; PromptTuning (labeled as PT) (Lester et al., 2021, the power of scale for parameter-efficient prompt tuning, In EMNLP (1), pages 3045-3059, Association for Computational Linguistics); $PT_{cf}$—an extension of PT to continual learning (cl) setting, which trains separate PT models for each stage and concatenates the learned soft-prompts during inference, based on the test label-set; Adapter, a parameter efficient tuning alternative introduced in (Houlsby et al., 2019, Parameter-efficient transfer learning for nlp, In International Conference on Machine Learning, pages 2790-2799, PMLR), which inserts light adapter layers into the backbone PLM and only tune them.

As text classification in-the-wild overlaps with continual learning, versions of the above baselines that use the following architecture-agnostic methods and settings relevant to the latter are also compared: Online regularization based methods: (i) A scalable online version of EWC (Kirkpatrick et al., 2017, Overcoming catastrophic forgetting in neural networks, Proceedings of the national academy of sciences, 114(13):3521-3526) proposed in (Schwarz et al., 2018, Progress & compress: A scalable framework for continual learning. In International Conference on Machine Learning, pages 4528-4537, PMLR), and (ii) Online MAS (Aljundi et al., 2018, Memory aware synapses: Learning what (not) to forget, In Proceedings of the European Conference on Computer Vision (ECCV), pages 139-154); Multitask model, which involves training on all stages simultaneously, not sequentially. The multitask model may be considered an oracle method for task-agnostic testing and may be considered as upper bound of memory-based methods in continual learning.

Evaluation Methods

For all the three NLP tasks, an exact match is considered as a correct prediction and report accuracy for News Classification and RE, and F1-score over the BIO format is computed for the NER task. By default, no other post-processing or verbalizer is applied, though these are orthogonal methods that can be separately used to enhance any of the discussed models. In the task-fused setting, constrained decoding is applied to selected baselines, marked by special indicator * (e.g., Finetune*$_{MAS}$). For the label modular prompt tuning framework, all seen label prompts are used for task-agnostic testing, and specific set of label prompts are used for task-specific and task-fused testing. Since other baselines do not have label-level modularity, for task-agnostic and task-fused testing, the checkpoint after the final stage is used. For task-specific testing, checkpoints are taken after each training stage.

Implementation Details

In an implementation, the learning rate is set to 0.5 for PT and the label modular prompt tuning framework, and 5 e-5 for ModelTuning and Adapter, using Adafactor (Shazeer and Stern, 2018, Adafactor: Adaptive learning rates with sublinear memory cost, In International Conference on Machine Learning, pages 4596-4604, PMLR) optimizer. A default bottleneck dimension of 24 is used. For online EWC and MAS, best results obtained over different regularization constant are reported. For all methods, maximum training epochs are set to 256 for Huff-postNews and FewNERD, and to 512 for FewRel. For the label modular prompt tuning framework, the selection probability p in constructing S is set to 50% and number of label transfer candidates K to 3.

Results on Task-Agnostic Setting

Referring to FIG. 9, illustrated is a table including the task-agnostic testing results. Across all testing setups in the three tasks, the label modular prompt tuning framework (labeled as "ModularPT") significantly outperforms all other baselines by a large margin. This empirically justifies that label modular prompt tuning framework is able to dynamically combine the label-specific knowledge learned across different training stages, in order to infer over the unseen combined label-space.

Amongst the baselines, ModelTuning performs relatively better, while the limited trainable parameters make the parameter efficient models more susceptible to catastrophic forgetting. For CL methods, MAS improves ModelTuning and Prompt Tuning by 4% and 8% on average respectively, but fails on Adapter. EWC is less effective in addressing forgetting across all baselines.

Also note that the $PT_{CL}$ extension may improve by 10-20% over vanilla PT. This shows that soft prompts, behaving like language tokens, have a compositional nature and may be concatenated to support multi-tasking. The label modular prompt tuning framework, in addition to exploiting this implicit language prior, also explicitly imposes subset-invariant loss to adapt to dynamic label spaces, further boosting final stage-agnostic performance by 14%-18% over $PT_{CL}$.

Results on Task-Fused Setting

Referring to FIG. 10, illustrated therein is a table including results on the task-fused setting. It is observed that none of the baselines are capable of handling this setting, as is evident from their abysmal performance across all testing stages. In absence of any label-modular representation, they are unable to utilize any information about the desired label-space. On the other hand, the label modular prompt tuning framework not only outperforms all baselines by an average margin of 37.5%, it also achieves 4%-14% better performance than the oracle multi-task ModelTuning on News Classification and NER.

The top performing baselines in this setting are selected to apply constrained decoding (marked with *), which improves their performance by 20%-30% on News and RE, 2%-4% on NER. However, the label modular prompt tuning framework still outperforms these baselines by 14%-27%. This significant improvement is evident of the fact that the label modular prompt tuning framework, by learning label-modular representations, may effectively combine partial knowledge from different training stages and condition the PLM on any target set of label prompts. This allows it to seamlessly adapt to dynamic unseen label spaces, without applying any post-processing or verbalizer.

Note that while $PT_{CL}$ is able to combine knowledge from multiple training stages to support task-agnostic testing, it fails to extract and consolidate specific knowledge corresponding to only the target label-set, across different stages.

Results on Task-Specific Setting

Referring to FIG. 11, illustrated therein is a table including results on the task-specific settings. While the label modular prompt tuning framework has proved to be particularly successful in handling the challenging non-stationary settings of task-agnostic and task-fused evaluations, it is also competitive under task-specific settings. From the results in FIG. 11, the average task-specific performance of the label modular prompt tuning framework is comparable to vanilla Prompt Tuning on the three tasks. Note that while MAS regularization boosts task-agnostic performance somewhat for ModelTuning and Prompt Tuning, it degrades their task-specific performance by 10%-40%. Similarly applying EWC regularization fails to improve over the vanilla models in this setting, which is less effective on task-agnostic evaluation. This shows the lack of robustness of these techniques across the different non-stationary settings. But the label modular prompt tuning framework is able to achieve state-of-the-art in task-agnostic and task-fused settings while remaining comparable to PromptTuning in task-specific evaluation. Besides, (Lester et al., 2021) showed that the performance gap between PromptTuning and ModelTuning will gradually close as the size of backbone PLMs scales up. We posit that the label modular prompt tuning framework, being an extension of Prompt-Tuning can similarly benefit from scaling-up of the PLM, but we leave this as future work owing to resource limitations.

Ablation and Quantitative Analysis

Referring to FIGS. 12 and 13, ablations and quantitative analysis are performed. FIG. 12 illustrates the performance loss on task-agnostic and task-fused settings when the model does not use label prompt transfer or subset-invariant loss. Further, quantitative analysis shows that the label modular prompt tuning framework possesses the desirable characteristics of a modular model. As shown in Algorithm 1 of FIG. 5, the label modular prompt tuning framework sets S=fits during inference. Different strategies of input prompt construction are used, including dropping label prompt(s) either corresponding to ground truth label(s) or one other random label, and permuting the default order of label prompts. As shown in FIG. 13, dropping the ground truth label prompt during inference degrades the mean performance by 57%-82% while dropping any other random label prompt boosts performance slightly. This strongly demonstrates the label grounding property of the label modular prompt tuning framework, that the knowledge of a label class is exclusively embedded in its corresponding label prompt. Also the label modular prompt tuning framework has low sensitivity to the order of label prompts during inference, which is a favorable property of label modular models.

Qualitative Analysis

As discussed with reference to FIG. 6, the label modular prompt tuning framework is able to predict correctly on a testing regime that is unseen during training, by extracting and consolidating label specific knowledge from multiple training stages. More example predictions are shown in FIG. 14, which indicate that the label modular prompt tuning framework is able to exploit in-context learning over label-prompts to generalize to unseen label-combinations during inference. In the example of FIG. 14, the label modular prompt tuning framework tags "Gilbert" as politician as he was "a delegate to" a government. In the same spirit, the label modular prompt tuning framework wrongly tags "Bert Bell" and "Rozelle" as athletes (true label being person_other) because they are associated with the sports league "NFU'. Such qualitative findings demonstrate the label modular prompt tuning framework's capabilities to learn label modular representations and integrate them dynamically during inference.

As such, extensive experiments show that the label modular prompt tuning framework is able to consolidate knowledge learned during sequential training stages (e.g., validated by the task-agnostic testing), and extract and recompose knowledge (e.g. validated by the task-fused testing), and maintain competitive in task-specific settings. The analysis also shows that the label modular prompt tuning framework has desirable modular properties including label grounding, low order sensitivity and in-context learning ability.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more FIGURES represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for training a prompt generator for text classification, the method comprising:
   receiving, via a data interface, a first training dataset associated with a first plurality of class labels for a first training process;
   generating, for a first instance of the first training dataset, a set of labels of interest by sampling from a set of possible class labels including the first plurality of class labels;
   generating, by the prompt generator, a first prompt based on the set of labels of interest;
   generating, by a pretrained language model, a task output in response to an input of the first instance prepended with the first prompt;
   computing a loss objective based on the task output and the set of labels of interest; and
   updating parameters of the prompt generator based on a computed loss function via backpropagation while the pretrained language model is frozen.

2. The method of claim 1, wherein the loss objective includes a subset invariant loss that accommodates the set of labels of interest that changes during the training.

3. The method of claim 1, further comprising:
   after the first training process, performing a second training process using a second training dataset associated with a second plurality of class labels,
   wherein the set of possible class labels for the second training process include the first plurality of class labels and the second plurality of class labels.

4. The method of claim 3, wherein the first plurality of class labels and the second plurality of class labels do not overlap.

5. The method of claim 1, wherein the generating the first prompt includes:
   generating a plurality of label prompts for the set of labels of interest respectively,
   wherein a first label prompt is generated by concatenating a first class label and a sequence of soft tokens, and
   wherein the sequence of soft tokens are generated based on representations associated with the first class label; and
   generating the first prompt using the plurality of label prompts.

6. The method of claim 5, further comprising:
   during a subsequent training process, initializing representations for a second plurality of class labels using representations for other class labels learned during one or more preceding training processes.

7. The method of claim 6, wherein the initializing representations for the second plurality of class labels includes:
   for a second label of the second plurality of class labels, determining top-K similar labels from combined class labels from the one or more preceding training processes; and
   initializing representations for the second label using representations of the top-K similar labels.

8. A non-transitory machine-readable medium comprising a plurality of machine-readable instructions which, when executed by one or more processors, are adapted to cause the one or more processors to perform a method comprising:
   receiving, via a data interface, a first training dataset associated with a first plurality of class labels for a first training process;
   generating, for a first instance of the first training dataset, a set of labels of interest by sampling from a set of possible class labels including the first plurality of class labels;
   generating, by a prompt generator, a first prompt based on the set of labels of interest;
   generating, by a pretrained language model, a task output in response to an input of the first instance prepended with the first prompt;
   computing a loss objective based on the task output and the set of labels of interest; and
   updating parameters of the prompt generator based on a computed loss function via backpropagation while the pretrained language model is frozen.

9. The non-transitory machine-readable medium of claim 8, wherein the loss objective includes a subset invariant loss that accommodates the set of labels of interest that changes during a training.

10. The non-transitory machine-readable medium of claim 8, wherein the method further comprises:
    after the first training process, performing a second training process using a second training dataset associated with a second plurality of class labels,
    wherein the set of possible class labels for the second training process include the first plurality of class labels and the second plurality of class labels.

11. The non-transitory machine-readable medium of claim 10, wherein the first plurality of class labels and the second plurality of class labels do not overlap.

12. The non-transitory machine-readable medium of claim 8, wherein the generating the first prompt includes:
   generating a plurality of label prompts for the set of labels of interest respectively,
       wherein a first label prompt is generated by concatenating a first class label and a sequence of soft tokens, and
       wherein the sequence of soft tokens are generated based on representations associated with the first class label; and
   generating the first prompt using the plurality of label prompts.

13. The non-transitory machine-readable medium of claim 12, wherein the method further comprises:
   during a subsequent training process, initializing representations for a second plurality of class labels using representations for other class labels learned during one or more preceding training processes.

14. The non-transitory machine-readable medium of claim 13, wherein the initializing representations for the second plurality of class labels includes:
   for a second label of the second plurality of class labels, determining top-K similar labels from combined class labels from the one or more preceding training processes; and
   initializing representations for the second label using representations of the top-K similar labels.

15. A system, comprising:
   a non-transitory memory; and
   one or more hardware processors coupled to the non-transitory memory and configured to read instructions from the non-transitory memory to cause the system to perform a method comprising:
       receiving, via a data interface, a first training dataset associated with a first plurality of class labels for a first training process;
       generating, for a first instance of the first training dataset, a set of labels of interest by sampling from a set of possible class labels including the first plurality of class labels;
       generating, by a prompt generator, a first prompt based on the set of labels of interest;
       generating, by a pretrained language model, a task output in response to an input of the first instance prepended with the first prompt;
       computing a loss objective based on the task output and the set of labels of interest; and
       updating parameters of the prompt generator based on a computed loss function via backpropagation while the pretrained language model is frozen.

16. The system of claim 15, wherein the loss objective includes a subset invariant loss that accommodates the set of labels of interest that changes during a training.

17. The system of claim 14, wherein the method further comprises:
   after the first training process, performing a second training process using a second training dataset associated with a second plurality of class labels,
   wherein the set of possible class labels for the second training process include the first plurality of class labels and the second plurality of class labels.

18. The system of claim 17, wherein the first plurality of class labels and the second plurality of class labels do not overlap.

19. The system of claim 14, wherein the generating the first prompt includes:
   generating a plurality of label prompts for the set of labels of interest respectively,
       wherein a first label prompt is generated by concatenating a first class label and a sequence of soft tokens, and
       wherein the sequence of soft tokens are generated based on representations associated with the first class label; and
   generating the first prompt using the plurality of label prompts.

20. The system of claim 19, wherein the method further comprises:
   during a subsequent training process, initializing representations for a second plurality of class labels using representations for other class labels learned during one or more preceding training processes.

* * * * *